US006656033B2

(12) United States Patent
Abe et al.

(10) Patent No.: US 6,656,033 B2
(45) Date of Patent: Dec. 2, 2003

(54) COIN DISPENSING APPARATUS FOR CIRCULATING OVERFLOWING COINS

(75) Inventors: Hiroshi Abe, Iwatsuki (JP); Masayoshi Umeda, Iwatsuki (JP)

(73) Assignee: Asahi Seiko Co., Ltd., Tokyo (JP)

( * ) Notice: Subject to any disclaimer, the term of this patent is extended or adjusted under 35 U.S.C. 154(b) by 63 days.

(21) Appl. No.: 09/972,703

(22) Filed: Oct. 3, 2001

(65) Prior Publication Data

US 2002/0077056 A1 Jun. 20, 2002

(30) Foreign Application Priority Data

Oct. 6, 2000 (JP) ....................................... 2000-307096

(51) Int. Cl.[7] ............................. G07D 1/00; G07F 9/10; B65G 47/18

(52) U.S. Cl. ........................... 453/23; 453/63; 194/350; 198/524

(58) Field of Search ............................. 453/16, 17, 18, 453/29, 49, 63, 51, 53, 57, 25, 34; 194/353, 334, 350; 221/13, 97, 14, 174; 198/524, 537, 444

(56) References Cited

U.S. PATENT DOCUMENTS 4,342,384 A * 8/1982 Fukase et al. .......... 273/143 R
4,475,564 A * 10/1984 Koester et al. ............... 453/57
5,100,367 A * 3/1992 Abe ............................ 453/49
5,190,495 A 3/1993 Taxon .......................... 453/32
5,240,099 A * 8/1993 Brown et al. ............... 194/317
5,913,400 A * 6/1999 Farmont ...................... 194/210
6,095,916 A * 8/2000 Tamaki ........................ 453/57
6,200,213 B1 * 3/2001 Cole ........................... 453/30

FOREIGN PATENT DOCUMENTS

JP 7000595 1/1995 ............. A63F/5/04
JP 07-000595 A * 1/1995 ............. A63F/5/04

* cited by examiner

*Primary Examiner*—Donald P. Walsh
*Assistant Examiner*—Mark J Beauchaine

(57) ABSTRACT

A coin dispensing apparatus includes a first coin storage member with a coin dispensing unit operatively connected for dispensing coins. A second coin storage member is connected to the first coin storage member for receiving an overflow of coins. A coin transporter unit is operatively mounted in the second coin storage member to receive coins from a bottom surface below the first coin storage member and to translate the coins to a coin guide member that operatively lifts the coins back to re-charge the first coin storage member.

18 Claims, 12 Drawing Sheets

COIN DISPENSING APPARATUS FOR CIRCULATING OVERFLOWING COINS

BACKGROUND OF THE INVENTION

1. Field of the Invention

The present invention relates to a coin dispensing apparatus, and more particularly, to a coin dispensing apparatus having a large bulk coin storage capacity, within a limited space, including a first coin storage bowl and a second coin storage bowl that can receiving overflowing coins which can operatively translate those coins through a coin transporter unit for re-circulating them to the first coin storage bowl.

2. Description of the Prior Art

High capacity coin hoppers have been suggested for storing, agitating and dispensing a large volume of coins or tokens in a gaming machine, such as illustrated in U.S. Pat. No. 5,190,495. A rotating coin dispensing disk is tilted to a horizontal surface and receives coins from a cylindrical mount adapter for ejecting coins from the coin hopper. A rotating cylinder is positioned between a coin bowl and the cylindrical mount adapter. Basically, the coins move through the coin hopper, the rotating cylinder, and the mounting adapter for dispensing by the rotating disk. The supply of coins depends upon a gravity feed, and as such, the coin bowl is tilted at least 30° and elevated relative to the disposition of the rotating coin disk dispenser.

The Japanese Laid Open Patent Publication 07/000595 discloses an overflow storage bowl which receives overflow coins from a hopper bowl, and a coin carrier device that can carry the coins from the storage bowl to the hopper bowl. A coin transporter unit is mounted within a sidewall of the hopper device for lifting the coins back to the coin hopper.

U.S. Pat. Nos. 4,589,433 and 5,122,094 are cited of general interest to disclose various types of hopper type coin dispensing apparatuses.

Increasing the coin storage capacity of a coin dispensing apparatus within the allocated space of a gaming machine remains an issue, particularly in the gaming industry, which relies on coin dispensing apparatuses and gaming machines such as slot machines, to continually pay out coins to players at high speeds. Therefore, there is still a need to maximize the coin storage capacity in this industry.

SUMMARY OF THE INVENTION

An object of the present invention is to provide an improved coin dispensing apparatus having a relatively large coin storage capacity by increasing the operative volumetric capacity of the limited space that is made available in a gaming machine.

The present invention includes a first coin storage member having a coin dispenser unit operatively connected to the first coin storage member for dispensing coins. A second coin storage member is operatively connected to the first coin storage member in such a manner to increase the overall storage capacity and is capable of receiving an overflow of coins when the first coin storage member stores a predetermined quantity of coins. A coin transporter unit is operatively mounted in the base of the second storage member to receive coins from a bottom surface of the second coin storage member and to translate them for removal from the second coin storage member. A coin guide member is operatively connected to the coin transporter unit for lifting coins from the coin transporter unit to return the coins to the first coin storage member. Appropriate sensors can monitor the storage level of coins in the first coin storage member and thereby automatically activate the coin transporter unit in the second coin storage member.

By optimally designing an arrangement between the first coin storage member and the configuration and shape of the second coin storage member, an increase in the storage capacity can be achieved and the previous loss of storage space beneath the first coin storage member can be utilized. The second coin storage member can basically encompass and extend beneath the first coin storage member whereby overflowing coins from the first coin storage member can fall by gravity into the second storage member. A horizontally orientated coin transporter unit can translate the coins from the bottom of the second coin storage member to a vertically orientated guide member that can lift the coins and deposit them by gravity into the first coin storage member.

The first coin storage member can still have a tilted disposition so that a gravity feed can direct coins to a coin dispenser unit operatively connected to the first coin storage member. The coin transporter unit mounted in the second coin storage member can be mounted underneath the first coin storage member with the coin guide member extending along a side of the second storage member for returning coins to the first coin storage member at a position above the coin dispenser unit. The arrangement of the coin transporter unit and coin guide member does not require a sloping bottom surface for the second coin storage member, and thereby maximizes the quantity of coins stored in the second coin storage member. The coin guide member can be relatively inexpensively constructed and can be integrally formed as a portion of the second coin storage member. The coin guide member can include a groove of an appropriate dimension for the coins which can be integrally formed on an outer wall surface of the second coin storage member. Alternatively, the coin guide member can be attached to an outer surface of the second coin storage member to further strengthen the construction. Preferably a drive member used for rotating the coin transporter unit is placed along one side of the second coin storage member.

BRIEF DESCRIPTION OF THE DRAWINGS

The exact nature of the present invention will be readily apparent from consideration of the following detailed description in conjunction with the accompanying drawings wherein.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein to specifically provide a coin dispensing apparatus having increased coin storage capabilities with a first coin storage member operatively positioned relative to a second overflow coin storage member so that it can re-charge the first coin storage member.

The present invention is designed to provide an improved coin dispensing apparatus that can dispense coins, medallions, disks, or tokens that are commonly used in the gaming industry. The present invention utilizes the terminology "coin" in a generic manner to also include not only monetary coins, but other forms of disks, tokens, and medallions that are frequently used in the gaming industry. The present invention addresses the specific confines and limitations of storage space that is allocated in a gaming machine and attempts to maximize the coin storage capacity while maintaining an economical arrangement of parts for both construction and maintenance purposes.

As can be appreciated, the various components and parts described in the present invention can be formed from either metal or plastic components. Additionally, a person skilled in this field can appreciate that various equivalent components can be utilized to achieve the same function and purpose of the present invention and that a control system (not shown), for example, such as a microcomputer-based system having appropriate sensors and input/output interfaces can be used to automatically drive motors for controlling the disposition of the coins.

Figure 1:
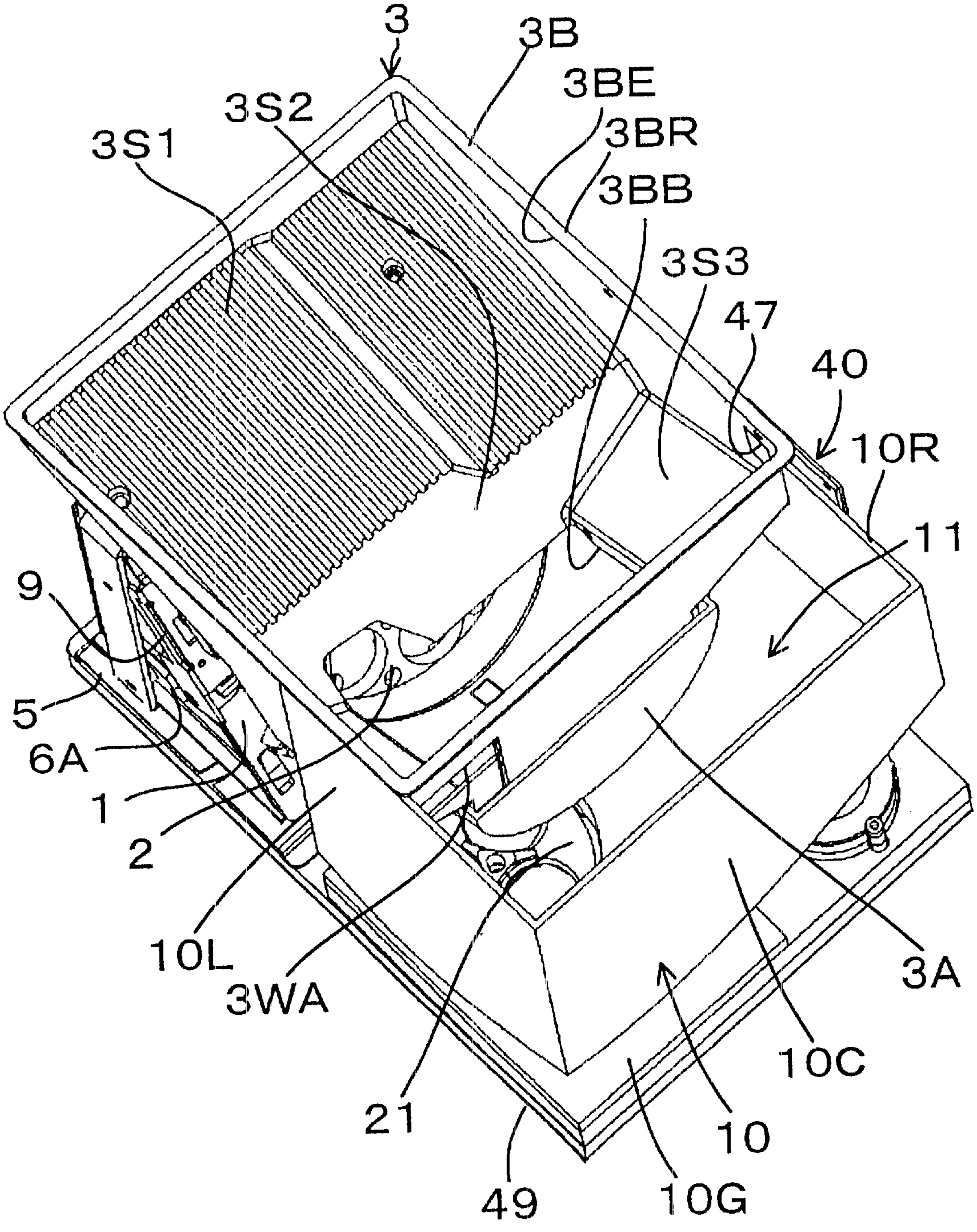
FIG. 1 is a perspective view of a first embodiment of the present invention.
Figure 2:
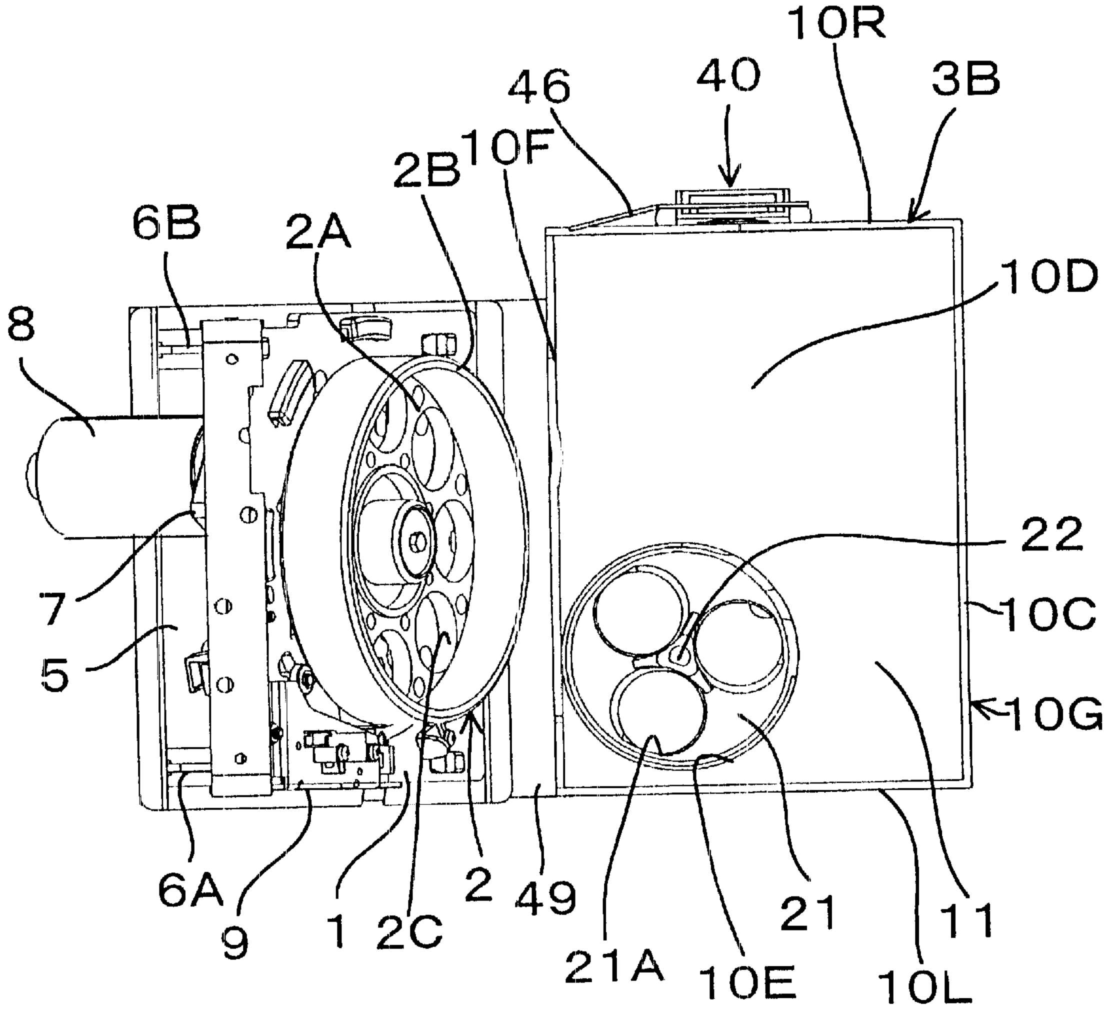
FIG. 2 is a top view of the first embodiment with a first coin storage bowl removed.

A first embodiment of the present invention is shown in FIGS. 1 through 8. Referring to FIGS. 1 and 2, an upright support plate 1 is mounted on a lower base in such a manner to provide a tilt to a first coin rotating disk 2 that forms a dispensing and segregating portion of a coin dispensing unit. A first storage coin bowl 3 is mounted to include sloping surfaces 3S1 and 3S2 above the first coin rotating disk 2 with a bottom wall 3AC sloping to direct coins by gravity feed to the rotating coin disk 2. The support plate 1 is fixed on the frame members 6A and 6B of the base 5. The support plate 1 provides a tilt relative to a horizontal support surface of about 60°. The first rotating coin disk 2 includes a circumferential disk configuration with a base place 2A and a perimeter flange 2B. A plurality of coin receptacle holes 2C, for example eight in the disclosed embodiment, are formed in the base plate 2A. An output shaft 7A of a gear reduction assembly such as a gear speed reducer unit 7 is connected to the rotating coin disk 2 and is fastened on the back surface of the support plate 1. The illustrated shaft line CL disclosed in FIG. 4 of the rotating coin disk 2 is approximately at a right-angle position to the support plate 1. The rotating coin disk 2 is thereby orientated at about 30° to the horizontal surface. An electric motor 8 can drive the speed reducer unit 7 which, in turn, drives the rotating coin disk 2.

When a coin is to be dispensed, it is supported on the support plate 1 after it has passed through the coin holes 2C, while the rotating coin disk 2 rotates. A protrusion (not illustrated) is provided on the rotating coin disk 2 of the back surface. When the coin contacts an appropriate pin on the support plate 1 at a predetermined position, the coin is thereby dispensed from a coin projection aperture or mouth 9.

Figure 3:
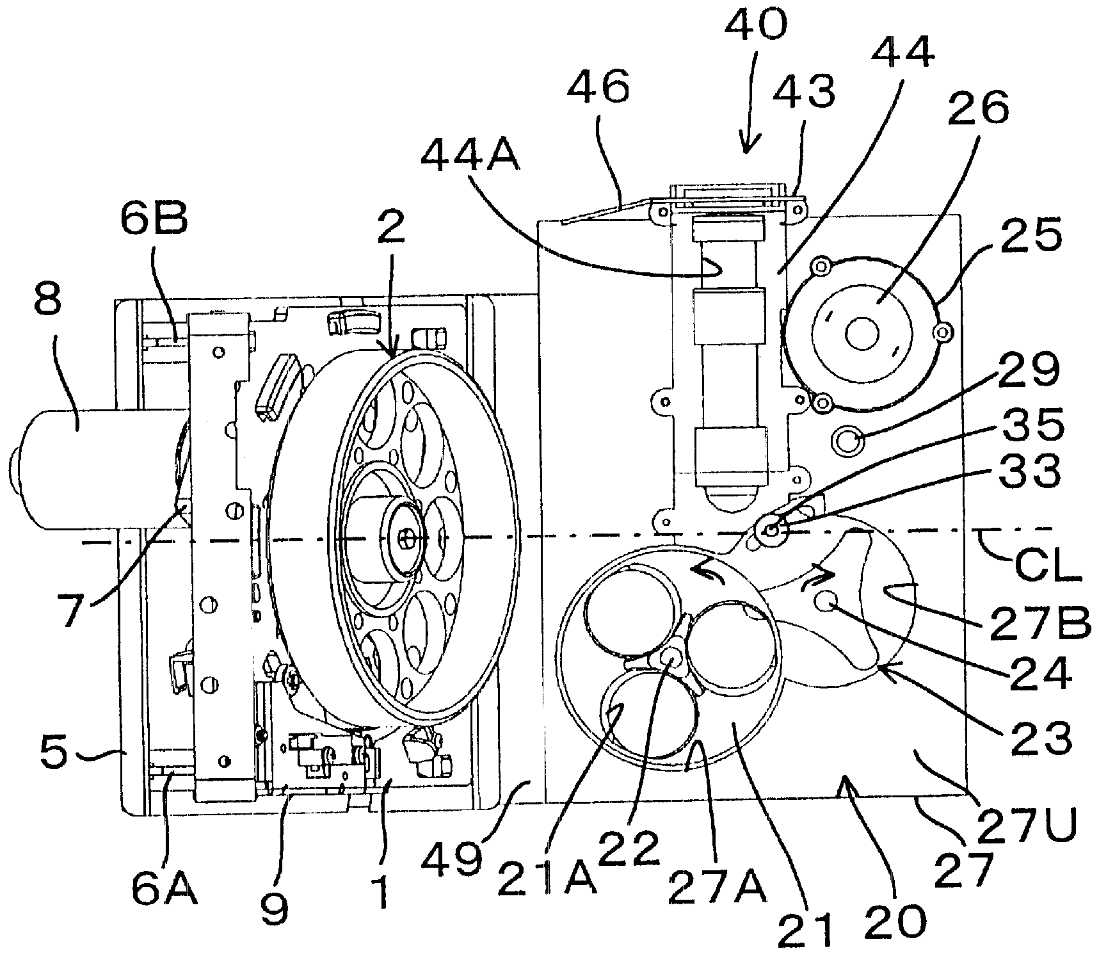
FIG. 3 is a top view with the first and second coin storage bowls removed for illustrative purposes.
Figure 4:
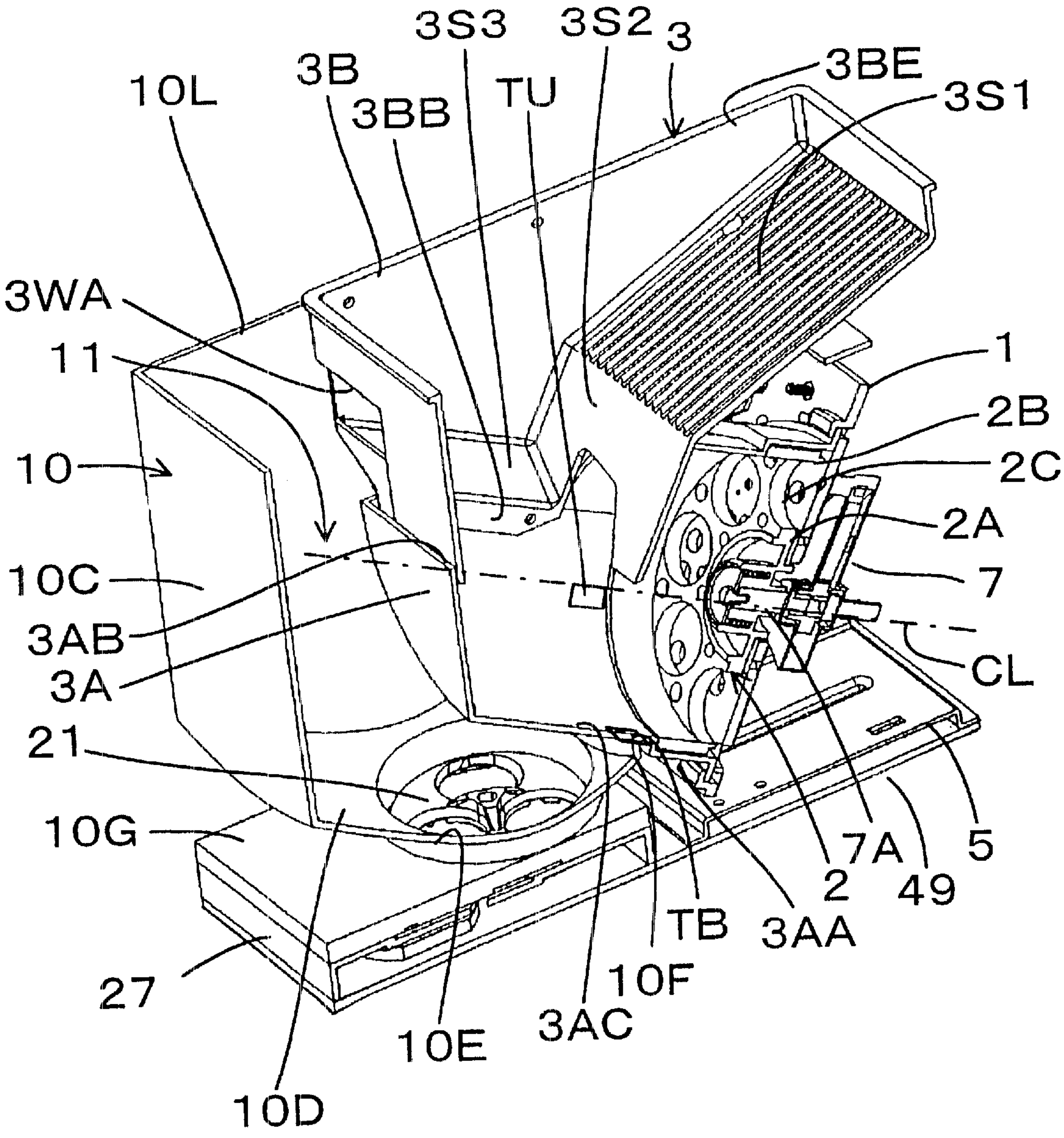
FIG. 4 is a cross-sectional perspective view to illustrate the relative arrangements of the first and second storage coin bowls.
Figure 5:
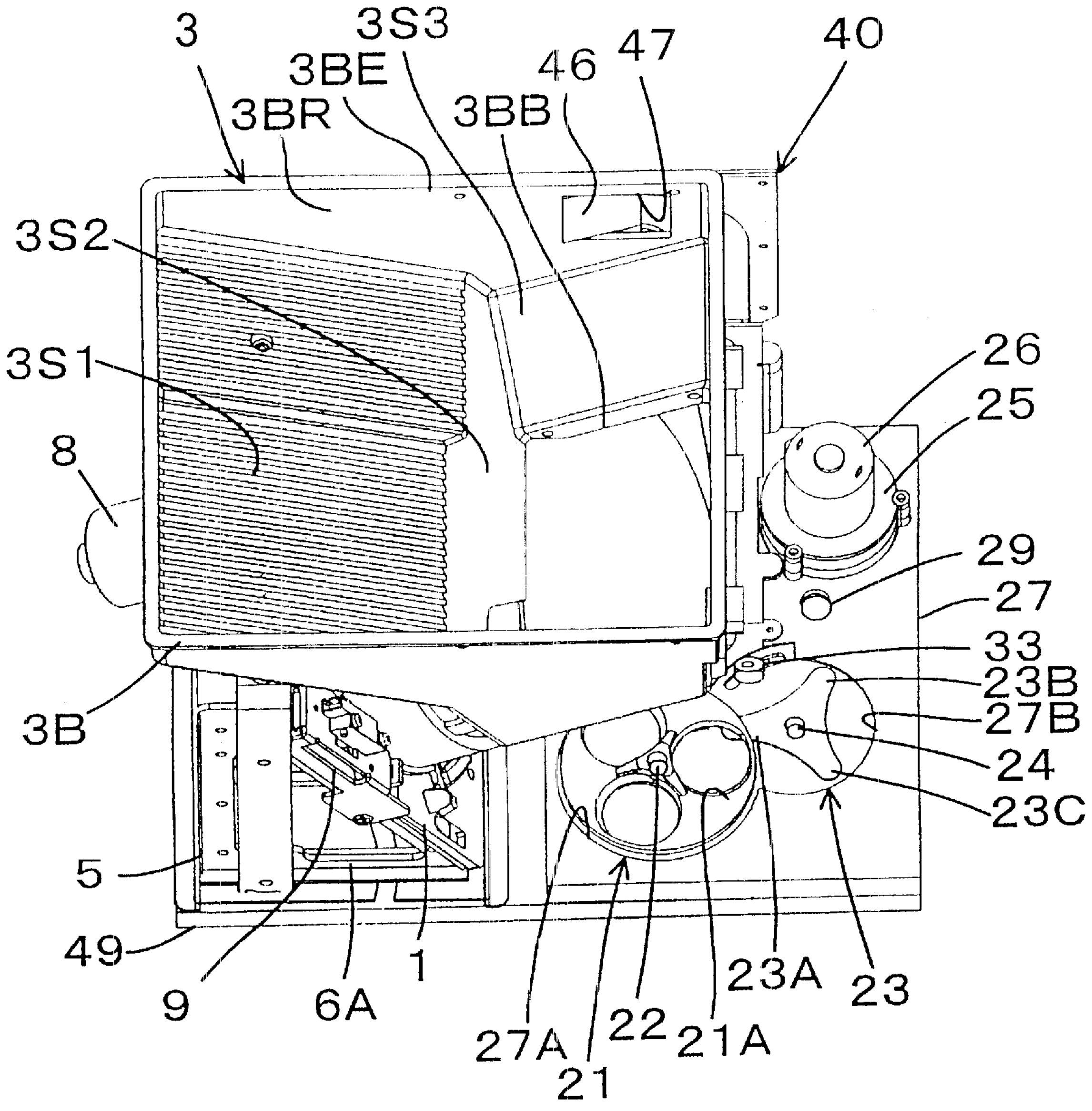
FIG. 5 is a perspective view with the second coin storage bowl removed.

As seen in FIGS. 1, 4 and 5, the first coin storage member or first coin bowl includes a lower base bowl 3A and an upper increased storage bowl portion 3B. The base bowl 3A is operatively connected to the first rotating coin disk 2 and has an inclined cylindrical base surface. The base bowl 3A includes the base rim 3AA which surrounds the first rotating coin disk 2 and an opening 3AB that forms an upper surface sidewall. The base rim structure 3AA is fixed to the support plate 1. The bottom wall 3AC is almost parallel with the axis of the shaft driving the rotating coin disk 2. Any coins C that contact the bottom wall 3AC will, by their weight and gravity, slide downward to interact with the first rotating coin disk 2. A sensor electrode TB is mounted in the bottom wall 3AC adjacent the rotating coin disk 2. This bottom surface electrode TB is positioned to contact conductive coins, and with an upper sensor electrode TU which is fixed at a sidewall inner surface of the base bowl 3A, constitutes a coin quantity sensor unit. When an electric current flows through the coins stacked between the electrode TB and TU, then it can be determined by a control circuit (not shown), that the coins in the first coin bowl storage member are at a level greater than a predetermined quantity of coins. As can be appreciated, the specific predetermined quantity of coins can vary over a range due to the random alignment of coins in a bulk storage configuration. When the output current is interrupted between the sensor electrodes TB and TU, a lift device shown in FIG. 3, is then operated by the control circuit. The increased bowl member 3B also includes the first slope 3S1 above the rotating coin disk 2, a second slope 3S2, and a third slope 3S3 on the side of the rotating coin disk 2. Generally, the storage bowl member 3B has a funnel configuration of a pyramid shape. The upper end of the coin storage bowl 3B provides a coin charge mouth or aperture 3BE of a generally rectangular configuration. The lower end of the coin bowl 3B is also of a rectangular exit configuration 3BB and is inserted into the opening 3AB of the base bowl 3A. The lower end of the coin bowl 3B is formed into a rectangular configuration which is smaller than the upper end including the exit 3BB. The exit 3BB of the coin bowl 3B is inserted into the opening 3AB of the base bowl 3A and is fixed by screws or other appropriate fasteners to the base bowl 3A at an upper end. An overflow mouth 3WA is formed in the vertical wall surface of the increase bowl 3B, which is positioned above and opposite to the first rotating coin disk 2. Any overflow of coins stored in the first coin bowl 3 will overflow by gravity through the opening 3WA to a second coin bowl storage unit 10.

As can be seen in FIG. 1, the second coin storage member or storage bowl 10 has a rectangular configuration that encompasses a forward end of the first coin bowl 3. The left wall panel 10L of the second storage bowl 10 is also affixed by screws or other appropriate fasteners on the left side wall of the increase bowl 3B. Likewise, the right wall panel 10R is affixed by screws or appropriate fasteners to the right side wall of the increase bowl 3B. The wall panel 10C, which is opposite to the first rotating coin disk, is almost arranged in a vertical alignment. A cylindrical exit hole or aperture 10E, as shown in FIG. 2, is positioned in the base plate 10D of the second storage bowl 10. The base plate 10D, as shown in FIG. 4, has a slanted configuration so that the coins will slide downward to engage with the exit hole 10E. The wall panel

10F, as shown in FIGS. 2 and 4, contacts the bottom wall 3AC of the base storage bowl 3A. Therefore, the second storage bowl 10 includes at least the base bowl 3A as part of its structure. As can be readily appreciated, the second storage area is formed between the second bowl 10, the base bowl 3A, and the increase bowl 3B. A rectangular flange 10G is formed about the circumference of the exit hole 10E and is fixed on the upper surface of the gear box 27.

Figure 6:
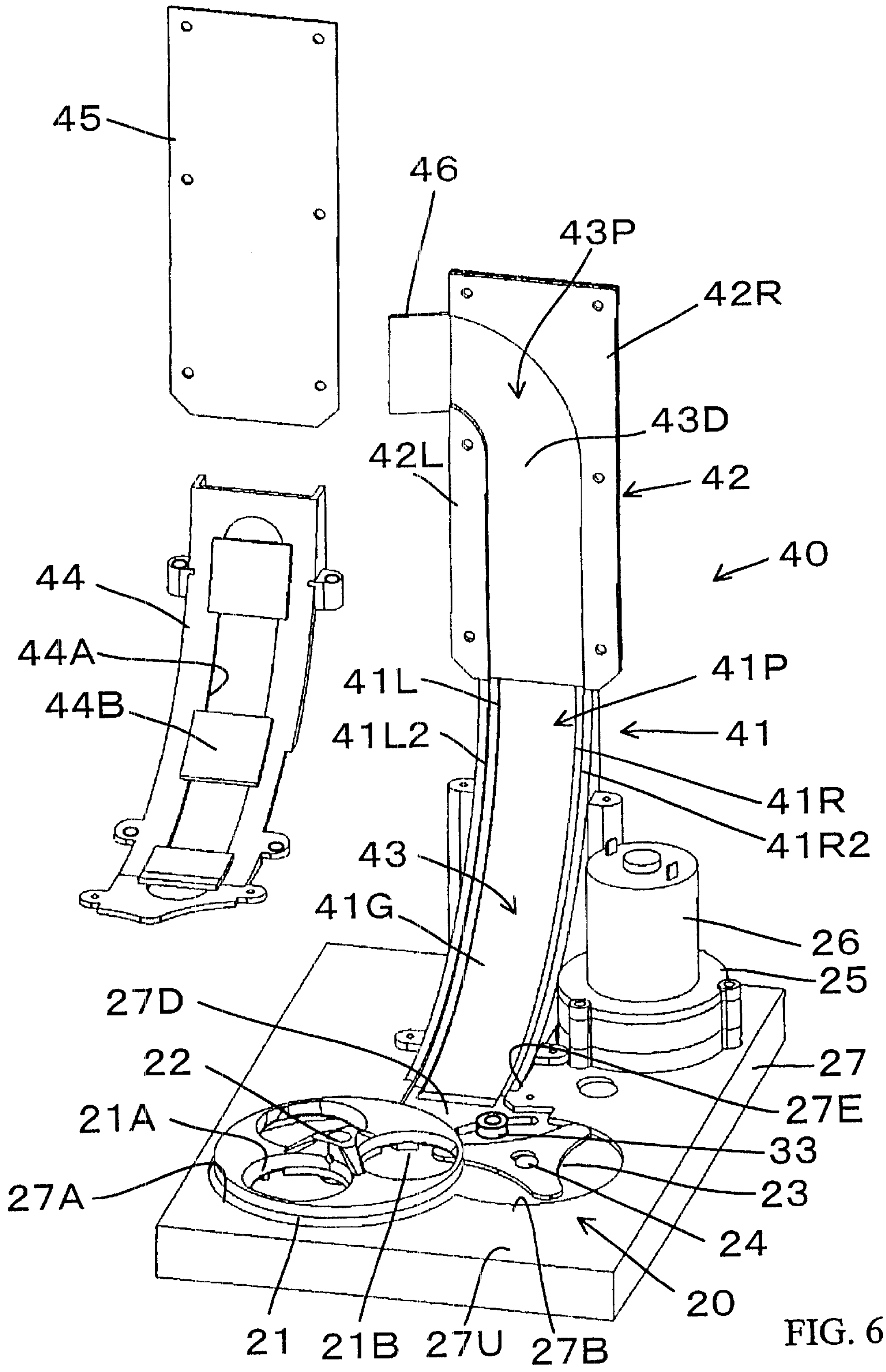
FIG. 6 is a partial exploded view of the coin transporter unit and the coin guide member.

A second coin rotating disk 21, which forms a portion of a coin transporter unit, is operatively mounted to the second coin storage member or bowl to remove coins from a bottom surface of the second coin storage bowl member and to translate them for removal from the second coin storage bowl member. The second rotating coin disk 21 is placed below the exit hole 10E of the second coin bowl 10. The coin transporter unit 20 includes a second rotating coin disk 21 and a rotation extrusion body 23. The second rotating disk 21 is circular and includes second coin passage holes 21A, which in the preferred embodiment is three holes. A feed protrusion 21B, as shown in FIG. 6, is placed between the passage holes 21A of the second rotating coin disk 21 back surface. The second rotating coin disk is positioned in a horizontal plane and below the lowest edge of the first rotating coin disk 2 as shown in FIG. 4. A rotating shaft 22 is mounted on the gear box 27 and is connected to this second rotating coin disk 21. The second rotating coin disk 21 is rotated at a first circular concavity 27A formed at the upper surfaces 27U of gear box 27 and exit hole 10E of the second coin bowl 10. The second rotating disk 21 is positioned at a left side wall 10L offset from the shaft line CL of the first rotating coin disk as shown in FIG. 3. The second coin rotating disk 21 is also placed below the coin passage mouth 3WA of the increase bowl 3B.

As shown in FIG. 6, the second rotating coin disk 21 has, adjacent to one side, a rotation extrusion body 23 of a three-prong shape having arms 23A, 23B, and 23C positioned at 120° offset spaces. Rotation body 23 is affixed to a rotating shaft 24 of the gear box 27. A second circular concavity 27B is placed at the upper surface 27U of the gear box 27 in a left side wall 10L from the shaft line CL. The rotation body 23 rotates so that the tips of the protruding arms 23A–23C are rotated in a horizontal plane beneath the second coin rotating disk 21. An electric motor 26 with a speed reducing gear arrangement 25 is affixed at the upper surface in a right wall panel 10R of the gear box 27. The electric motor 26 is placed at an outside edge of the slope of the base plate 10D of the second coin bowl member 10. While the electric motor 26 is on an upper surface 27U of the gear box 27, its arrangement does not interfere with the position of the second coin bowl 10. A gear 28 is affixed at the output shaft 25A of gear box 27 beneath the speed reducer 25 shown in FIG. 8. An idle gear 30 is fixed on a rotation counter shaft 29 mounted in the gear box 27 and engages with gear 28. A gear 31 is affixed at the upper end of the rotating shaft 24 and engages with the gear 30. Gear 32 is affixed at the lower end of the rotating shaft 22 and engages with gear 31. Gears 30–32 are the same diameter and are rotated in synchronization.

Figure 7:
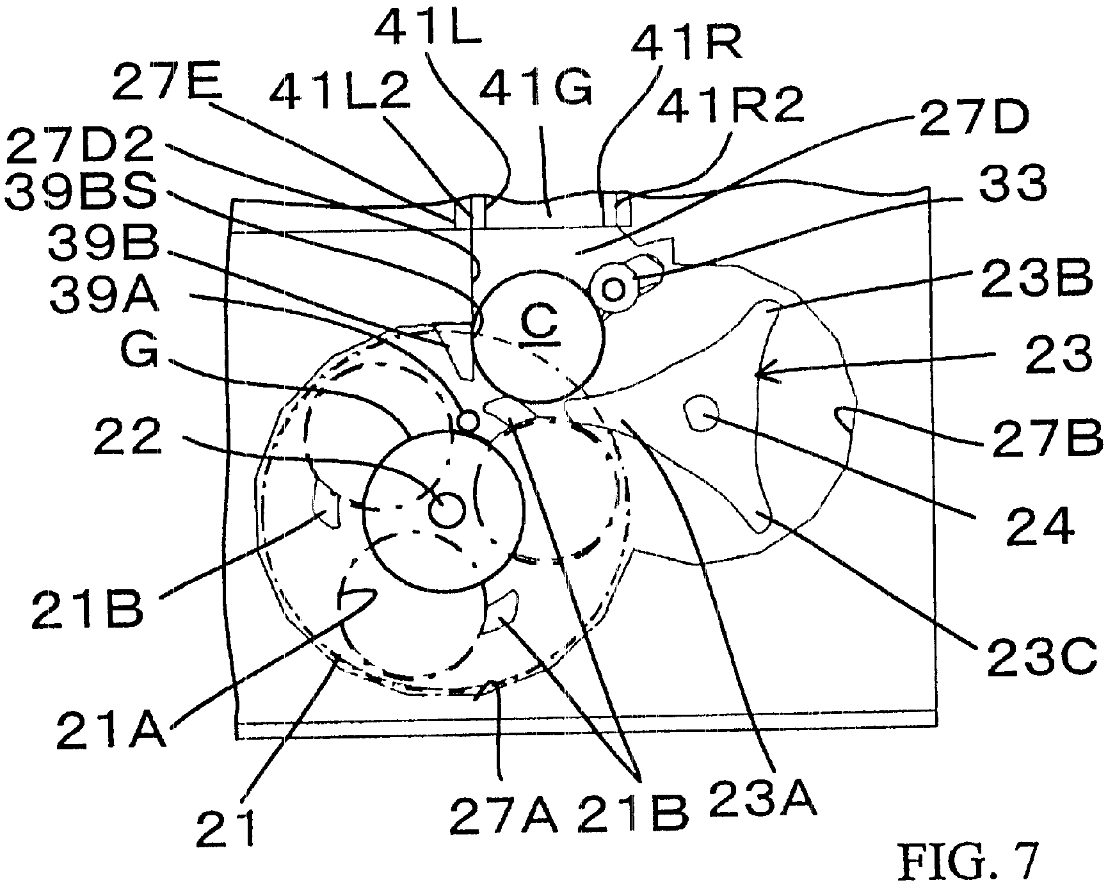
FIG. 7 is a partial top view of the coin transporter unit.
Figure 8:
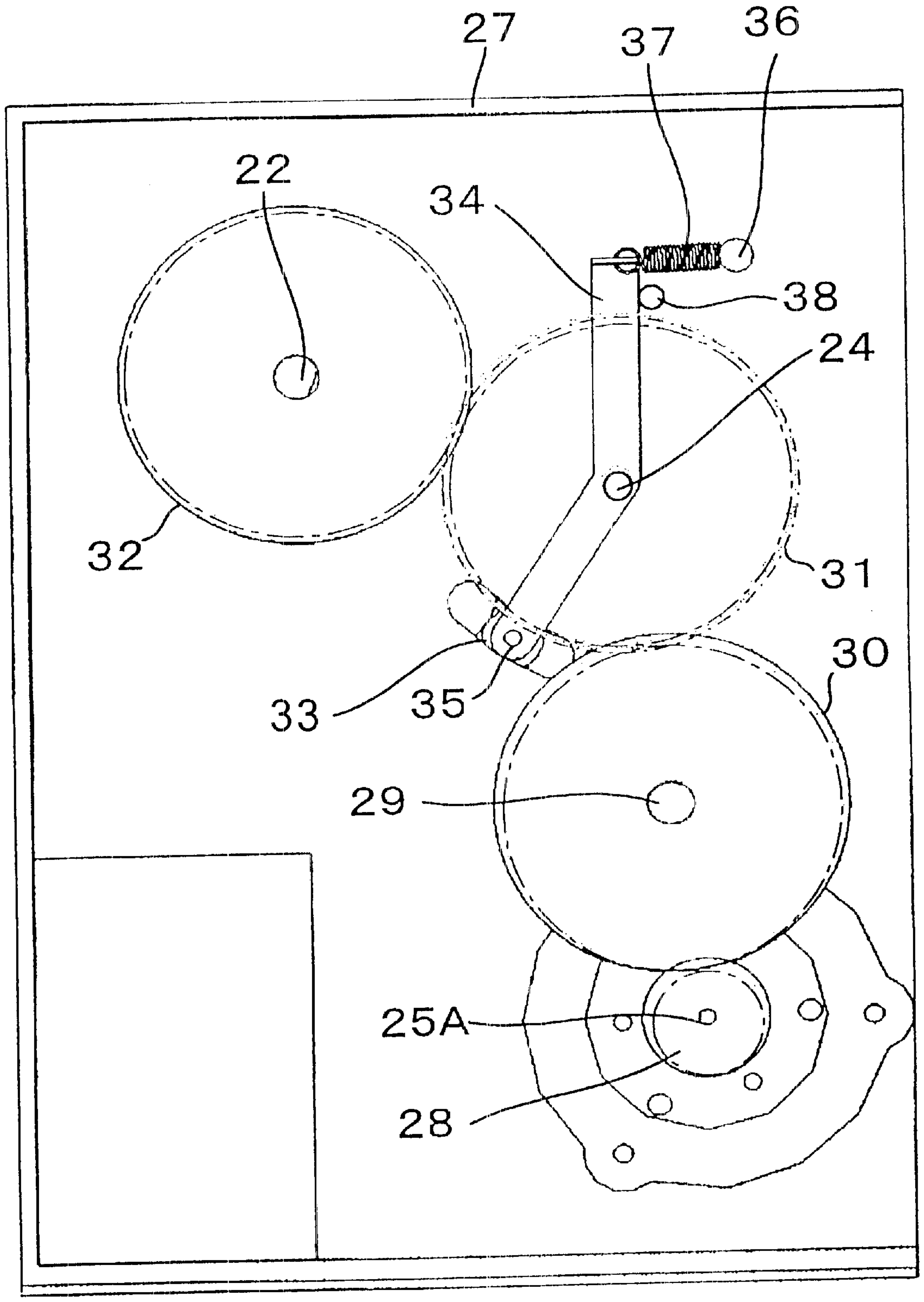
FIG. 8 is a rear view of a gear assembly of the first embodiment.
Figure 9:
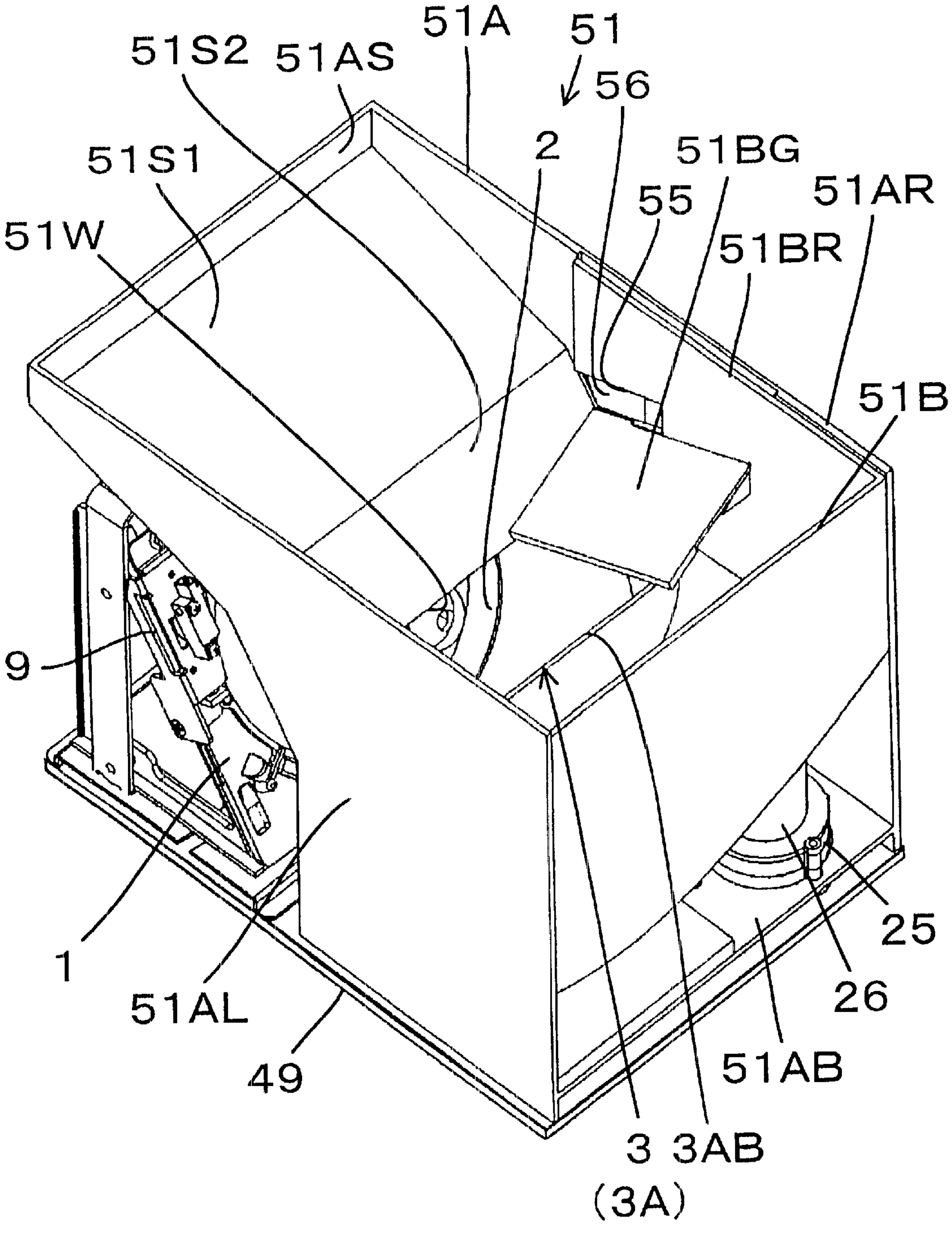
FIG. 9 is a perspective view of a second embodiment of the present invention.
Figure 10:
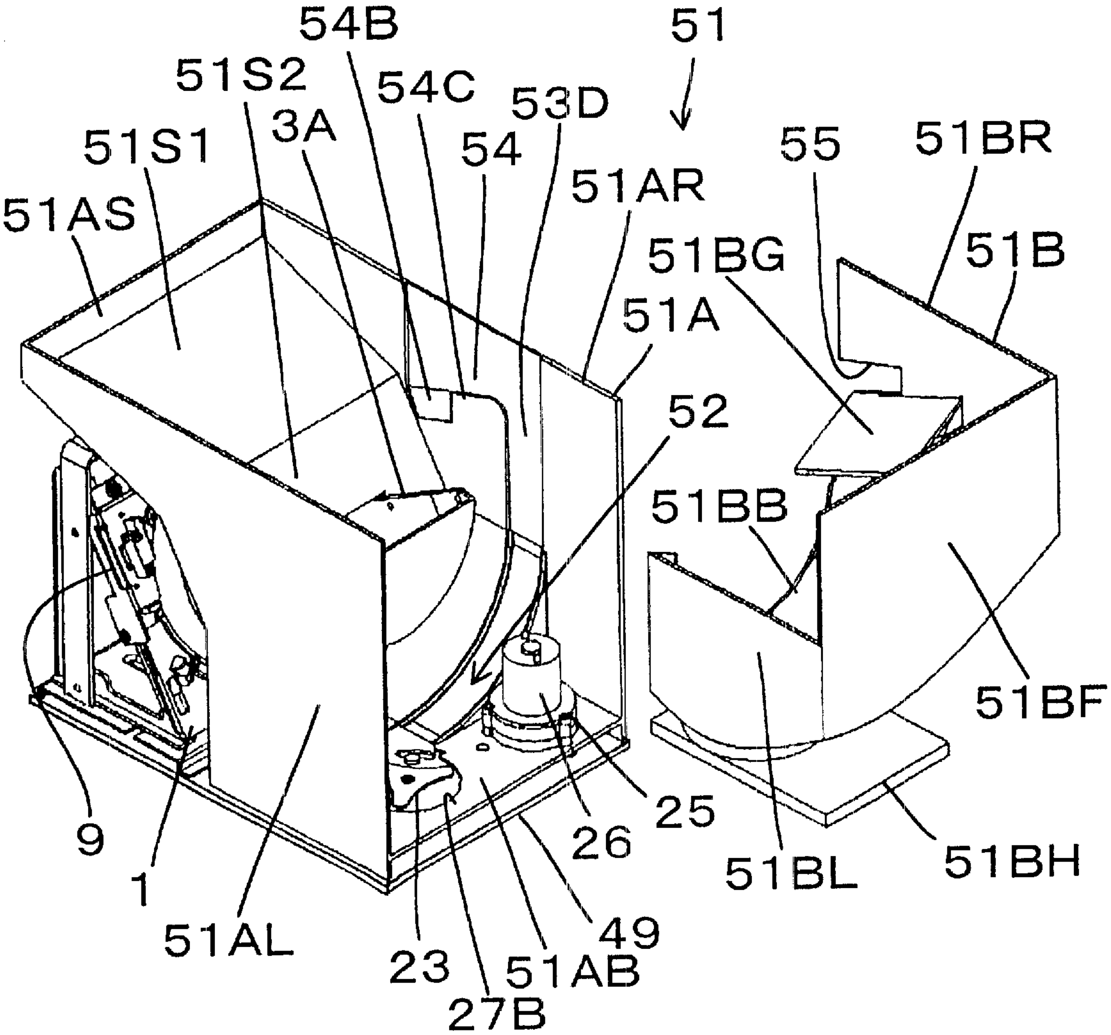
FIG. 10 is a partially exploded view of the second embodiment.
Figure 11:
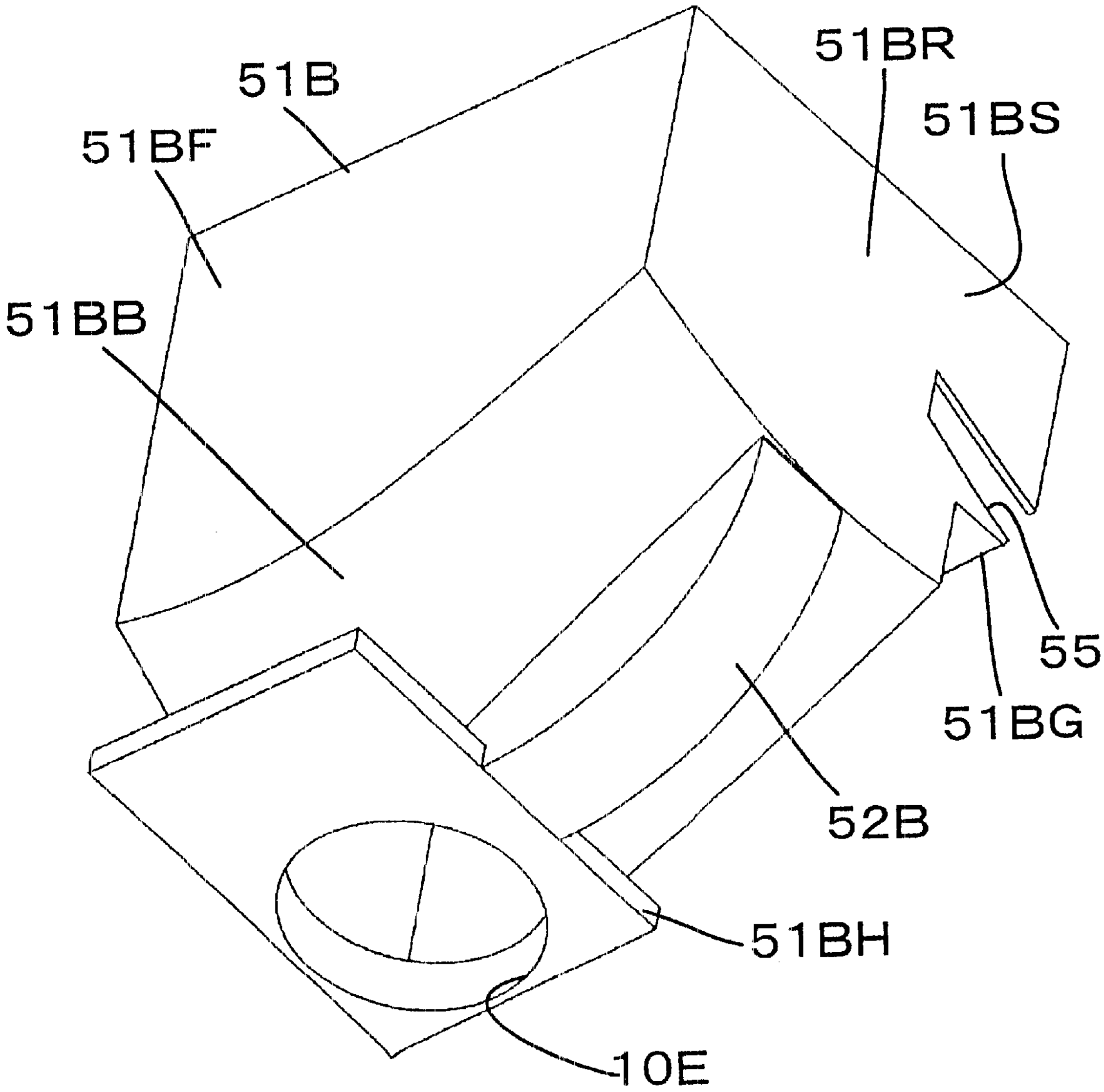
FIG. 11 is a rear perspective view of the second coin storage bowl of the second embodiment.

A mobile roller 23 is positioned at the boundary of a depression or groove 27D and the second circular concavity 27B as shown in FIG. 7. The mobile rollers 33 are freely mounted at the tip of the shaft 35 as shown in FIG. 8. Shaft 35, in turn, is fixed on a fluctuation lever 34 placed on the back surface side of the gear box 27. The fluctuating lever 34 is arranged about the rotating shaft 24 and is biased by a spring 37 anchored on a pin 36 on the underside of the gear box 27 so that the fluctuation lever 34 is biased in a counter-clockwise direction. Mobile roller 33 is rotated, in FIG. 7, in a counter-clockwise direction when the fluctuation lever 34 is stopped by the stopper 38. The space between the mobile roller 33 and a regulation piece 39B of a first circular concavity 27A is set at a distance less than the diameter of the coin C thereby preventing any backward movement of the coin C as it is being translated to a coin guide member. A guide disk G, as shown in FIG. 7, is fixed in the first circular concavity 27A about the rotating shaft 22 so that it is concentrically arranged. Three feed protrusions 21B are placed between the second coin passage hole 21A at the same radial position from the rotating shaft 22 so that they rotate outside of the guide disk G. A rod-like regulation pin 39A is placed in between the guide disk G and the rotation locus of the feed protrusion 21B. The regulation pin 39A is affixed on the gear box 27 outside of the feed protrusion 21B rotation locus. The regulation piece 39B includes a linear guide plane 39BS which is almost parallel to form a tangent between the first circular concavity 27A and the second circular concavity 27B. A second induction plane 27D2 of derivation groove 27D is formed in the extension of the guide plane 39BS of the upper surfaces 27U of the gear box 27.

The coin guide member 40, which provides a passageway for the coins, is shown in FIGS. 6 and 7 and includes an arc division 41, a straight division section 42, an arc guide 44, a straight guide 45, and an induction guide 46. The arc division 41 includes an arc plane 43 with a one quarter circumferential length. The straight division 42 continues the arc division 41 and is mounted above it. An overlapping arc guide 44 is bent in a complimentary configuration to capture the coins being translated up the arc guide 44. A straight guide portion also captures the coins when mounted on the straight division 42. The rectangular slab-shaped guide 46 guides the coins back to the first storage bowl 3. The arc division member 41 is affixed at the upper surface 27U of the gear box 27. As can be appreciated, the groove 41G is slightly smaller than the diameter of the coin, so that the coin will slide along the rims 41L and 41R. An outer rim 41R2 and 41L2 can interface with the arc division guide 44. Appropriate fasteners can be utilized to fasten the structure together. The lower end of the arc division 41 is arranged adjacent to the groove 27E formed on the upper surface 27U of the gear box 27. The upper surface of the rims 41R and 41L are located in the extension of a plane of the groove 27D.

Openings 44A are provided in the arc guide 44 in order to monitor coin movement, while a stiffening bracket 44B extends across the arc guide 44. The upper vertical straight division 42 has spacers 42L and 42R which interface with the straight guide 45. As can be appreciated, a coin is directed through the straight groove 43D to the curve passageway 43P to direct the coins to a rectangular tubular guide 46 that protrudes on the left side. The tip of the guide 46 tilts to the increased storage bowl 3B. The guide 46 is inserted into a coin storage mouth 47 of the sidewall 3BR of increase storage bowl 3B. This coin supply mouth is placed above the lower end of the first coin rotating disk 2 so that it can supply the re-circulated overflow coins to the base coin bowl 3A. Base 5 and gear box 27 are fixed and united on the plane substrate 49.

In operation, the first embodiment of the present invention has bulk coins C supplied until the upper electrode sensor TU is contacted. At that point, a predetermined quantity of coins is contained within the second storage compartment 11 of the second coin bowl 10. As additional coins are inserted during the play of the game, they are introduced into the coin charge mouth 3BE to the first coin storage bowl 3. Overflow coins C will thereby flow from the coin mouth 3WA to the second coin bowl 10.

When coins are to be dispensed, the first coin rotating disk 2 is activated by energizing the electric motor 8 so that it is rotated through the speed reducer unit 7. A coin C will fall within the coin holder 2C by the rotation of the first coin rotating disk 2. The coin is then subsequently dispensed from the aperture 9. Other coins C will slide down the bottom wall 3AC to the first coin rotating disk 2 until such a point that the electric current will not flow between the upper sensor electrode TU and the bottom sensor electrode TB. At this time, it can be determined that the quantity of coins C remaining in the base storage bowl 3A is lower than a predetermined number. At this point, a control circuit (not shown) will then be activated to energize motor 26 to thereby rotate the second rotating disk 21 in a counter-clockwise direction through the speed reducer 25, the output shaft 25A, and the respective gears 28–32. The rotation extrusion body 23 is synchronized with the second coin rotating disk 21 and is rotated in a clockwise direction. As a result of the rotation of the second coin rotating disk 21, coins are stirred and are caused to fall into the second coin passage hole 21A when the coins become parallel to the second rotating coin disk 21. The coin C is supported in the basal plane of the first circular concavity 27A and is guided in the guide disk G so that the feed protrusion 21B of the back surface of the second rotating disk 21 pushes it forward.

The coin C will be stopped at the regulation pin 39A when the feed protrusion 21B pushes it to that point and then the feed protrusion 21B will push the coin out to the groove 27D. The coin C will contact the guide plane 39BS of the regulation piece 39B. At this point, the coin C will be temporarily positioned as shown in FIG. 7 until arm 23A will push the coin C forward to be guided by the guide plane 39BS and the second guide plane 27D2 whereby it is pushed into the groove 27D. The coin C will act against the bias force of the spring 37 to push the mobile roller 33 to the right side direction. Afterwards, the mobile roller 33 pushes the coin C out to the groove 27D. The coin C is captured at the upper part of the groove 27D and the lower end division of the arc guide 44. After the initial coin C passes, the fluctuation lever 34 is rotated by spring 37 and is stopped by the stopper 38 to remain in a standby condition. In this standby condition, the coin C is stopped by mobile roller 33 if coin C attempts to return to rotating coin disk 21. The distribution of the coins C will continue as the second coin rotating disk 21 rotates. The successive coins will push the preceding coins up the passive coin guide member 40 until the coins are ultimately dispensed back into the first storage coin bowl 3. The electric motor 26 will continue to operate to re-charge the overflowed coins back into the coin storage bowl 3 until the upper sensor electrode TU and the lower sensor electrode TB are again electrically interconnected through the accumulation of stored bulk coins.

By this particular arrangement, it is possible to re-direct the coins discharged from the second coin bowl from initially a horizontal arrangement to a vertical orientation through the coin guide member 40 in a relatively limited space. As can be appreciated, the coin guide member 40 is initially arranged in a horizontal position and below the lower end of the first coin rotating disk 2. This increases the storage space of the second storage bowl 10 whereby the quantity of the coins that can be utilized in this limited space is significantly increased.

Additionally, by connecting the coin guide member 40 at the right wall panel 10R of the second coin storage bowl 10, the right wall panel 10R is further reinforced.

As a modification to this first embodiment, the first coin bowl 3 can be composed of only the base bowl 3A. In such an arrangement, guide boards can be utilized to dispense the coin C from the straight passage 43D to fall into the opening 3AB of the base coin bowl 3A. Additionally, the rotation extrusion body 23 may be deleted, and accordingly, the feed protrusion 21B of the second coin rotating disk will push the coins C into the groove 27D. In such an arrangement, the coin transporting unit 20 includes the second rotating coin disk 21 which is operatively connected to the coin guide member. Additionally, the second coin rotating disk 21 can be of a type which dispenses coin C one by one by pins which are affixed to the surface of a rotating disk in a predetermined space. The coin quantity sensor can also be modified to use a light sensor whereupon the vertical buildup of the bulk coins can prevent the emitted light from a light emitter from reaching a photo receptor thereby activating a sensor signal for the control circuit.

Figure 12:
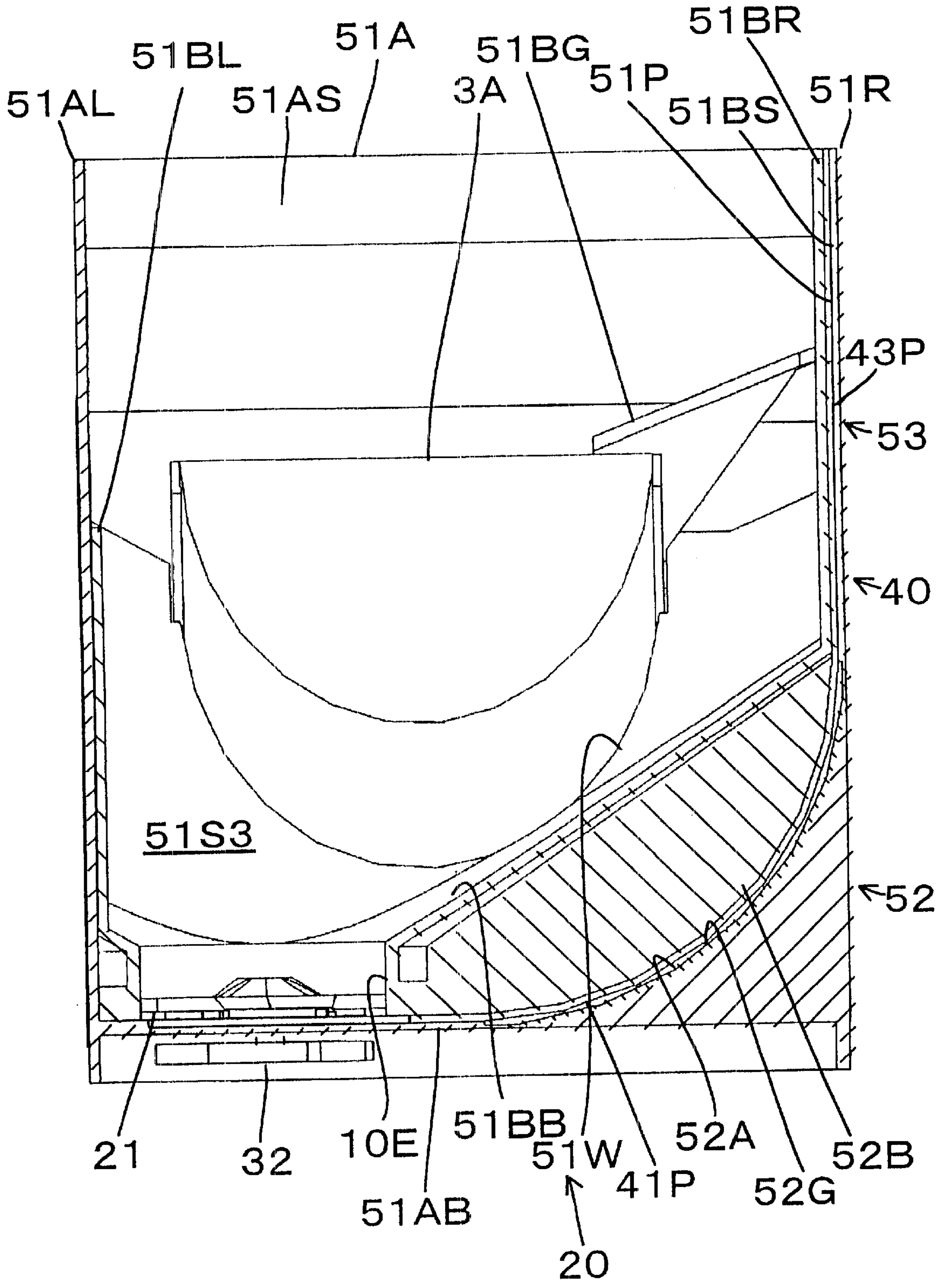
FIG. 12 is a cross-sectional view of the coin guide member for lifting coins in the second embodiment.

A second embodiment of the present invention can be understood by reference to FIGS. 9–12. In this embodiment, the first coin storage bowl 3 is only the base bowl 3A and the structure of the coin guide member 40 is altered. A second coin bowl 51 represents a combination between the first coin bowl piece 51A and a second bowl piece 51B. The first coin bowl piece 51A includes a tip sidewall 51AS including left and right L-shaped sideboards 51A and 51AR. The first bowl piece 51A further includes a ramp 51S1 extending from the sidewall 51AS and a second interconnecting ramp 51S2 with a lower straight board 51S3 as seen in FIG. 12. The first coin bowl piece 51A includes a first circular concavity 27A and a second circular concavity 27B, an arc concavity 52A, straight groove 53D, and guide groove 54 of the base plate 51A. The arc concavity 52A constitutes an arc division 52. The respective straight groove 53D and groove 54 of the straight division 53 are formed as indentations in the inner surface of the right side board 51AR.

In arc division 52, the first and second stage divisions are equal to the first embodiment so that an arc groove 52G is formed for permitting the passage of coins. A relatively straight passageway 53D extends upward from the continuation of the arc groove 52G and interconnects with the groove 54 to permit coins to fall onto the second ramp 51S2 side. At the second ramp 51S2 and the straight board 51S3, a semi-circular opening 51W is formed so that the base coin bowl 3A may fit into it. Therefore, the first coin bowl 3 is the base bowl 3A. An electric motor 26 with a speed reducing gear arrangement 25 is affixed at the base plate 51AB on the right side board 51AR. The gears (shown in FIG. 8) are also included in the back surface side of the base plate 51AB. A second bowl piece 51B has a rectangular configuration and includes a left side board 51BL and the right side board 51BR, an episternum 51BF and a base plate 51BB. The episternum 51BF connects between the left side board 51BL and the right side board 51BR.

A circular exit hole 10E is formed at the base plate 51BB and the base plate 51BB has slopes which approach from the lower end of the side plate 51BL, 51BR, and 51BF to the exit hole 10E. As can be appreciated, a coin C will slide down the base plate 51BB. An arc convex division 51B is opposite to the arc concavity 52A to form a curving coin passage groove on the underside of the base plate 51BB. The surfaces 51BS cover the straight groove 53D and groove 54 to provide a straight passageway 43P and groove 51P. A rectangular oblique notch 55 is formed at the right side board 51BR under the groove 54, which is opposite to a second ramp 51S2. Wall surface 54B of the groove 54 tilts downward to the second coin bowl 51 and is opposite to the coin supply mouth 56. The guide plate 51BG is affixed to the inner surface of the right side board 51BR below the coin supply mouth 56.

Mounting flange 51BH is formed in the circumference of the exit hole 10E. Referring to FIG. 12, the combination between the first compass bowl piece 51A and the second compass piece 51B is illustrated. The first bowl piece 51A is combined so that the base bowl 3A may protrude into the second bowl 51 from the opening 51W. In this arrangement, the first bowl piece 51A is affixed to the substrate 49.

The first coin rotating disk 2 is placed below the first ramp 51S1 and the second ramp 51S2. The second bowl piece 51B fits into the inside of the first bowl piece 51A so that the external surface of the left side board 51BL of the second bowl piece 51B contacts the inner surface of the left side board 51AL of the first bowl piece 51A. The external surface of the right side board 51BR contacts along the inner surface of the left side board 51AR. Flange 51BH is affixed onto base plate 51AB and the second coin storage bowl 51 is thereby constructed. The second coin storage bowl 51 includes the base bowl 3A which is the first coin storage bowl 3. The arc coin passageway 41P is constructed of the arc convex division 52B of the second bowl piece 51B covering the arc concavity 52A. The straight coin passageway 43P and passage 51P are constructed by the external surface 51B as to the right side board 51BR that cover the straight groove 53D and grooves 54. The tip of the guide plate 51BG is located above the opening 3AB of the base bowl 3A.

As with the first embodiment, the coin rotating disk 21 and the rotation extrusion body 23 will push the coins C up the arc passageways 41P. The coins, when they are pushed through the passage way 51P, will fall into the inclination side stage division 54C. In turn, the coin C will fall onto the wall surface 54B by the pull of gravity and will slide on the wall surface until it reaches the coin supply mouth 56 and falls into the guide plate 51BG. As can be appreciated, the coin guide passageway is constructed by using the coin bowls' wall surface thereby simplifying the structure and increasing the utilization of the narrow space that is available. The coin passageway 51P, which is connected to the coin supply mouth 56, is a coin passageway which tilts above, thereby coin C will not block the supply mouth 56 because it does not flow into the coin passageway 51P.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A coin dispensing apparatus comprising:

a first coin storage member;

a coin dispensing unit operatively connected to the first coin storage member;

the first coin storage member is aligned with the coin dispensing unit to provide a first bottom surface with a sufficient slope to permit gravity to pull coins stored in the first coin storage member to the coin dispensing unit;

a second coin storage member positioned adjacent the first coin storage member and having a portion with a second bottom surface occupying a space below the sloped first bottom surface of the first coin storage member, the first coin storage member having an opening to permit overflow coins stored in the first coin storage member to fall into the second coin storage member, the second bottom surface having an aperture positioned lower than the first bottom surface;

a coin transporter unit positioned beneath the second bottom surface and operatively connected to the aperture for receiving a gravity feed of coins stored in the second coin storage member, the coin transporter unit translates coins from the second coin storage member; and a coin guide member positioned below the second coin storage member and extending along a side of the second coin storage member with an exit aperture communicating with the first coin storage member, the coin guide member is operatively connected to the coin transporter unit to return coins from the second coin storage member to the first coin storage member, wherein the coin guide member provides an arcuate coin passageway between the second coin storage member and the first coin storage member.

2. The coin dispensing apparatus of claim 1 further including a sensor unit for determining the level of stored coins in the first coin storage member and the coin transporter unit includes a motor that can be activated by the sensor unit to supply coins from the second coin storage member to the first coin storage member.

3. The coin dispensing apparatus of claim 1 wherein the coin guide member includes an indentation formed integrally in the second coin storage member to form a portion of a coin passageway.

4. The coin dispensing apparatus of claim 1 wherein an exterior surface of the first coin storage member forms part of an interior surface of the second coin storage member.

5. The coin dispensing apparatus of claim 1 wherein the coin transporter unit includes a rotating coin disk that has an axis of rotation perpendicular to a horizontal support surface.

6. The coin dispensing apparatus of claim 5 wherein a gear reduction assembly is mounted below the coin transporter unit and is operatively connected to the rotating coin disk and a motor is mounted below the second coin storage member and is operatively connected to the gear reduction assembly.

7. A coin dispensing apparatus comprising:

a first coin storage member;

a coin dispensing unit operatively connected to the first coin storage member for dispensing coins;

a second coin storage member operatively connected to the first coin storage member for receiving an overflow of coins when the first coin storage member stores a predetermined quantity of coins;

a coin transporter unit operatively mounted in the second coin storage member to receive coins from a bottom surface of the second coin storage member and to translate coins for removal from the second coin storage member; and a coin guide member operatively connected to the coin transporter unit for lifting coins from the coin transporter unit to return the coins to the first coin storage member wherein the coin guide member includes an indentation formed integrally in the second coin storage member to form a portion of a coin passageway.

8. The coin dispensing apparatus of claim 7 further including a sensor unit for determining the level of stored coins in the first coin storage member and the coin transporter unit includes a motor that can be activated by the sensor unit to supply coins from the second coin storage member to the first coin storage member.

9. The coin dispensing apparatus of claim 8 wherein the coin guide member provides an arcuate coin passageway between the second coin storage member and the first coin storage member.

10. The coin dispensing apparatus of claim 7 wherein an exterior surface of the first coin storage member forms part of an interior surface of the second coin storage member.

11. The coin dispensing apparatus of claim 10 wherein the coin transporter unit includes a rotating coin disk that has an axis of rotation perpendicular to a horizontal support surface.

12. The coin dispensing apparatus of claim 11 wherein a gear reduction assembly is mounted below the coin transporter unit and is operatively connected to the rotating coin disk and a motor is mounted below the second coin storage member and is operatively connected to the gear reduction assembly.

13. A coin dispensing apparatus comprising:

a first coin storage member;

a coin dispensing unit operatively connected to the first coin storage member;

the first coin storage member is aligned with the coin dispensing unit to provide a first bottom surface with a sufficient slope to permit gravity to pull coins stored in the first coin storage member to the coin dispensing unit;

a second coin storage member positioned adjacent the first coin storage member and having a portion with a second bottom surface occupying a space below the sloped first bottom surface of the first coin storage member, the first coin storage member having an opening to permit overflow coins stored in the first coin storage member to fall into the second coin storage member, the second bottom surface having an aperture positioned lower than the first bottom surface;

a coin transporter unit positioned beneath the second bottom surface and operatively connected to the aperture for receiving a gravity feed of coins stored in the second coin storage member, the coin transporter unit translates coins from the second coin storage member; and a coin guide member positioned below the second coin storage member and extending along a side of the second coin storage member with an exit aperture communicating with the first coin storage member, the coin guide member is operatively connected to the coin transporter unit to return coins from the second coin storage member wherein an exterior surface of the first coin storage member forms part of an interior surface of the second coin storage member.

14. The coin dispensing apparatus of claim 13 further including a sensor unit for determining the level of stored coins in the first coin storage member and the coin transporter unit includes a motor that can be activated by the sensor unit to supply coins from the second coin storage member to the first coin storage member.

15. A coin dispensing apparatus comprising:

a first coin storage member;

a coin dispensing unit operatively connected to the first coin storage member;

the first coin storage member is aligned with the coin dispensing unit to provide a first bottom surface with a sufficient slope to permit gravity to pull coins stored in the first coin storage member to the coin dispensing unit;

a second coin storage member positioned adjacent the first coin storage member and having a portion with a second bottom surface occupying a space below the sloped first bottom surface of the first coin storage member, the first coin storage member having an opening to permit overflow coins stored in the first coin storage member to fall into the second coin storage member, the second bottom surface having an aperture positioned lower than the first bottom surface;

a coin transporter unit positioned beneath the second bottom surface and operatively connected to the aperture for receiving a gravity feed of coins stored in the second coin storage member, the coin transporter unit translates coins from the second coin storage member; and a coin guide member positioned below the second coin storage member and extending along a side of the second coin storage member with an exit aperture communicating with the first coin storage member, the coin guide member is operatively connected to the coin transporter unit to return coins from the second coin storage member to the first coin storage member wherein the coin guide member includes an indentation formed integrally in the second coin storage member to form a portion of a coin passageway.

16. The coin dispensing apparatus of claim 15 wherein the coin transporter unit includes a rotating coin disk that has an axis of rotation perpendicular to a horizontal support surface.

17. The coin dispensing apparatus of claim 16 wherein a gear reduction assembly is mounted below the coin transporter unit and is operatively connected to the rotating coin disk and a motor is mounted below the second coin storage member and is operatively connected to the gear reduction assembly.

18. A coin dispensing apparatus comprising:

a first coin storage member;

a coin dispensing unit operatively connected to the first coin storage member for dispensing coins;

a second coin storage member operatively connected to the first coin storage member for receiving an overflow of coins when the first coin storage member stores a predetermined quantity of coins;

a coin transporter unit operatively mounted in the second coin storage member to receive coins from a bottom surface of the second coin storage member and to translate coins for removal from the second coin storage member;

a coin guide member operatively connected to the coin transporter unit for lifting coins from the coin transporter unit to return the coins to the first coin storage member, wherein the coin guide member provides an arcuate coin passageway between the second coin storage member and the first coin storage member; and a sensor unit for determining the level of stored coins in the first coin storage member and the coin transporter unit includes a motor that can be activated by the sensor unit to supply coins from the second coin storage member to the first coin storage member.

* * * * *